US007664195B2

(12) United States Patent  (10) Patent No.: US 7,664,195 B2
Chenu-Tournier et al.  (45) Date of Patent: *Feb. 16, 2010

(54) METHOD TO INCREASE THE BIT RATE IN A COMMUNICATION SYSTEM

(75) Inventors: Marc Chenu-Tournier, Paris (FR); Philippe Morgand, Athis-Mons (FR)

(73) Assignee: Thales, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 11/507,001

(22) Filed: Aug. 21, 2006

(65) Prior Publication Data

US 2007/0014387 A1 Jan. 18, 2007

Related U.S. Application Data

(63) Continuation of application No. 10/214,583, filed on Aug. 9, 2002, now Pat. No. 7,149,255.

(30) Foreign Application Priority Data

Aug. 10, 2001 (FR) .................................. 01 10740

(51) Int. Cl.
*H04B 7/02* (2006.01)
(52) U.S. Cl. ...................... 375/267; 375/316; 375/347; 375/229; 375/233
(58) Field of Classification Search ................ 375/267, 375/259, 347, 299, 316, 229, 233
See application file for complete search history.

(56) References Cited

U.S. PATENT DOCUMENTS

| 5,566,209 A | | 10/1996 | Forssen et al. |
| 5,812,601 A | * | 9/1998 | Schramm ..................... 375/262 |
| 6,317,612 B1 | | 11/2001 | Farsakh |
| 6,879,626 B1 | * | 4/2005 | Sudo ........................... 375/219 |

(Continued)

FOREIGN PATENT DOCUMENTS

EP 00 899 896 3/1999

(Continued)

OTHER PUBLICATIONS

Edward A. Lee, et al., "Digital Communication", 1990, Kluwer Academic Press, Boston, XP002197169, pp. 335-339.

*Primary Examiner*—Mohammad H Ghayour
*Assistant Examiner*—Leila Malek
(74) *Attorney, Agent, or Firm*—Oblon, Spivak, McClelland, Maier & Neustadt, L.L.P.

(57) ABSTRACT

Disclosed is a method and a device to increase the bit rate in a communications system comprising N transmitters ($2_N$) and M receivers ($3_M$), with M greater than or equal to N. The method comprises the following steps.

a) simultaneously sending different messages on several of the N ($2_N$) transmitters,
b) simultaneously receiving the superimposition of the messages sent during the step a) on several of the M ($3_M$) receivers or reception sensors,
c) estimating the characteristics of the transmission channel for each pair constituted by a transmission sensor and a receiver sensor,
d) jointly estimating all or at least the majority of the messages received in taking account of the signals as well as the characteristics of the transmission channel.

Application to GSM signals and to systems of unicast transmission and multicast transmission, namely multipoint-to-point and multipoint-to-multipoint transmission.

20 Claims, 4 Drawing Sheets

U.S. PATENT DOCUMENTS

| | | | |
|---|---|---|---|
| 6,891,897 B1 * | 5/2005 | Bevan et al. | 375/265 |
| 6,937,592 B1 * | 8/2005 | Heath et al. | 370/342 |
| 2002/0110205 A1 * | 8/2002 | Piirainen | 375/346 |
| 2002/0141518 A1 * | 10/2002 | Piirainen | 375/346 |
| 2004/0014432 A1 * | 1/2004 | Boyle | 455/101 |

FOREIGN PATENT DOCUMENTS

| | | |
|---|---|---|
| WO | WO 99/40698 | 8/1999 |
| WO | WO 00/74264 | 12/2000 |
| WO | WO 01/580049 | 8/2001 |

* cited by examiner

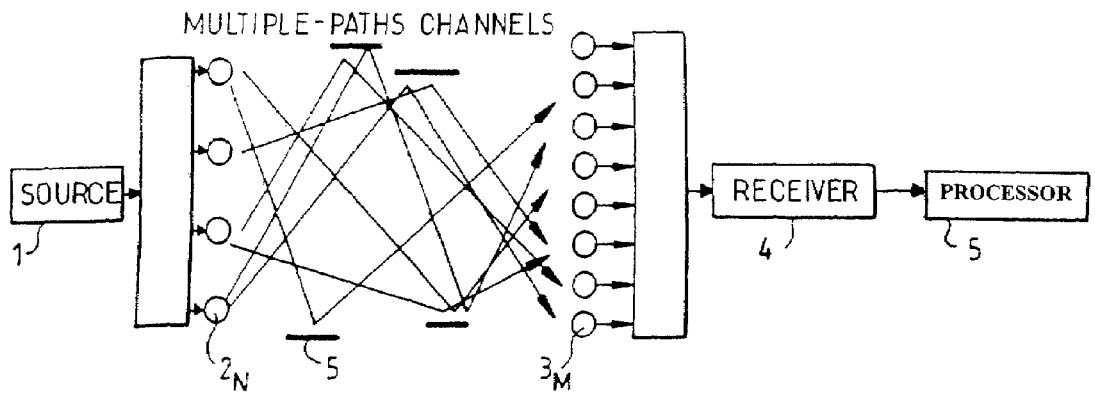
 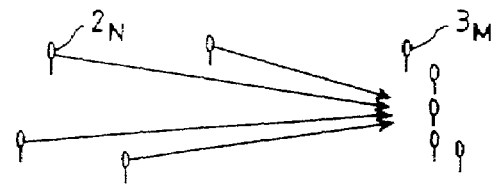
FIG.2A   FIG.2B
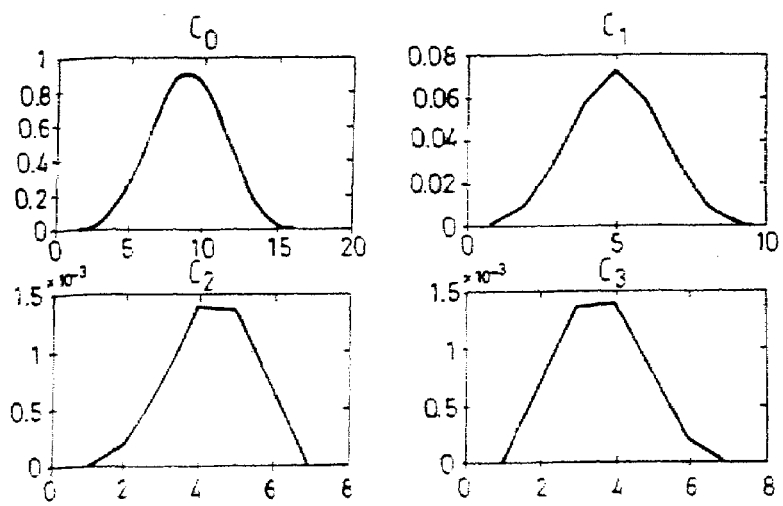
FIG.3

METHOD TO INCREASE THE BIT RATE IN A COMMUNICATION SYSTEM

RELATED APPLICATIONS:

This application is a continuation of application Ser. No. 10/214,583, filed on Aug. 9, 2002, now U.S. Pat No. 7,149,255, which claims foreign priority to 0110740, filed Aug. 10, 2001.

BACKGROUND OF THE INVENTION

1. Field of the Invention

The present invention pertains more generally to the field of communications systems and, more particularly, to wireless communications, for examples cellular networks.

It can be applied to any communications system in which the structure of the data transmitted does not comprise any intrinsic system for differentiating between the different users if they are making simultaneous transmission (as is the case, for example with CDMA codes which are used to used to identify the different transmitters).

The system according to the invention can be applied more particularly to dedicated unicast or multicast communications (in which one point corresponds to a receiver or to a transmitter having one or more antennas).

2. Description of the Prior Art

Most present-day communications systems generally make use of a single transmission antenna. Consequently, the capacity of the transmission channel or the maximum achievable bit rate for the data transmitted is fairly low.

There are also known ways of using spread-spectrum codes such as the CDMA (Code Division Multiple Access) to exploit the (channel) diversity of a communications system such as the UMTS (Universal Mobile Telecommunications System).

The U.S. Pat. No. 6,115,427 discloses a method and a system to augment the data bit rate in a transmission system and provide a diversity of antennas by using several transmit and receive antennas. This method relies mainly on a step for the space-time encoding of the data at transmission in order to differentiate between the different data streams and to detect them in conjunction.

The drawback of these methods, especially, is that their implementation leads to a modification of the transmission or communications systems, for example the modification of existing transmitters or receivers.

SUMMARY OF THE INVENTION

The present invention relies on a novel approach based on a joint processing of all the signals. This approach considers all the signals sent to be useful rather than estimating only one of them and considering the others to be noise for example. It can be applied to both unicast links and multicast links.

The method especially uses the diversity provided by the transmission channel, which is spatially sampled by a number of reception sensors greater than or equal to the number of transmission sensors and an adapted processor or computer.

In normal operation, the method does not make use of a spread-spectrum code associated with a user, which is the known approach in most of the prior art devices. It can be applied without distinction to multicast transmission as well as to unicast transmission.

The object of the invention pertains to a method to increase the bit rate in a communications system comprising N transmitters and M receivers or reception sensors, with M greater than or equal to N, the structure of the data transmitted having no intrinsic system to differentiate between the users. The method comprises at least the following steps.

a) simultaneously sending different messages on several of the N transmitters, b) simultaneously receiving the superimposition of the messages sent during the step a) on several of the M reception sensors, with M greater than or equal to N, c) estimating the characteristics of the transmission channel for each pair constituted by a transmission sensor and a receiver sensor, d) jointly estimating all or at least the majority of the messages received in taking account of the signals as well as the characteristics of the transmission channel or channels.

The step d) is performed, for example, with a receiver adapted to the joint estimation of the reference sequences transmitted in the signal and the propagation channels.

For the step d), the method uses, for example, a linear filter minimizing the mean squared error between the output of the receiver and the real symbols of the signal received at the reception sensors or again a non-linear filter minimizing the mean squared error in taking account of a "feed forward" filtering function and a "feedback" filtering function and of the of the vector $b_n$ of the symbols of the received signal The method can be applied to GSM signals comprising a reference sequence used for the step d).

The method is used, for example, for a same user simultaneously transmitting several different messages or for several users each transmitting its own message.

The object of the invention also relates to a device to increase the bit rate in a transmission system comprising several transmitters N and several receivers M, wherein the device comprises a device adapted to performing the steps of the method described here above.

The object of the invention especially has the following advantages:

It offers a transmission system that provides an increase in the bit rate and robustness of cellular type transmission, described for example in the ETSI standard for GSM communications systems.

It does not require space-time encoding in normal operation.

With slight modification of existing standards, it enables:

the multiplication by N of the bit rate of a BTS or node type transmission, the multiplication by N of the bit rate of a cellular radio-mobile type reception system, an increase in robustness with respect to disturbances generated by the transmission channel.

It can be applied in confined types of transmission channels such as train tunnels or metropolitan underground rail transit tunnels, whatever the type of transmission medium, and can also be used in urban, mountainous and rural environments where the spatial diversity is sufficient to provide for high-quality transmission.

BRIEF DESCRIPTION OF THE DRAWINGS

Other features and advantages shall appear from the following description, given by way of an illustration that in no way restricts the scope of the invention, and from the appended drawings, of which:

FIG. 1 shows an architecture of a transmission system according to the invention, FIGS. 2A and 2B show the layout of co-localized and de-localized antennas, FIG. 3 gives a view of the functions used to linearize the GMSK modulation.

MORE DETAILED DESCRIPTION

Figure 4:
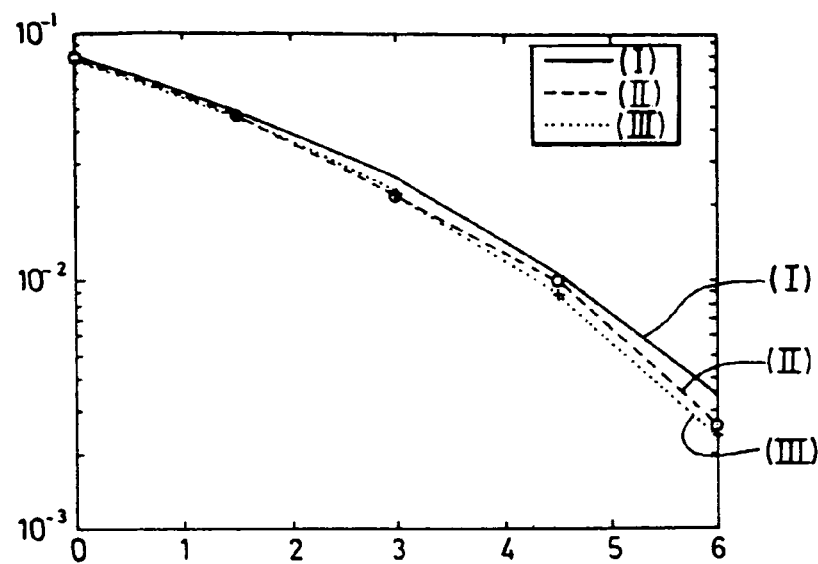
FIG. 4 shows several comparative curves implementing the linear approximation and a standard demodulation.

In order to provide for a clearer understanding of the method and system of transmission according to the invention, the following description is given by way of an illustration that in no way restricts the scope of the invention. The description pertains to a cellular type transmission system, such as the GSM system, in a multiple-user context. The structure of the data transmitted has the characteristic of not comprising an intrinsic system to differentiate between users, at least in normal operation.

FIG. 1 shows a block diagram of a GSM type communications system comprising a transmitter source 1 comprising N transmission antennas $2_N$ and M reception antennas $3_M$ connected to a receiver 4 and to a device such as a processor 5 provided with an algorithm adapted to the execution of the steps of the method according to the invention. The number M of antennas at reception is greater than or equal to the number N of antennas at transmission. If N users are present, they form the network of the N transmission antennas.

The object of the present invention relies especially on the fact that the networks of the M reception antennas and of the N transmission antennas associated with the characteristics of the transmission channel can be used especially to exploit the diversity needed to implement MIMO (Multiple Input Multiple Output) type antennas based on the decorrelation of the different channels for the detection of the data streams transmitted.

The N transmission antennas $2_N$ preferably transmit several data streams corresponding to different messages. The signals are propagated between the source and the receiver along several paths. These are direct paths or multiple paths resulting from reflections on obstacles 5.

Two examples of the layout of the antennas at transmission and at reception are shown in FIGS. 2A and 2B.

According to one alternative embodiment (FIG. 2A), one and the same user can simultaneously transmit several different messages. This corresponds to transmission antennas $2_N$ that are close to one another. In this case, the transmission antennas $2_N$ and reception antennas $3_M$ are kept at a sufficient distance from each other as compared with the spatial decorrelation distance, thus generating decorrelated propagation channels.

According to another alternative embodiment (FIG. 2B), each of the N users, for example, transmits his own message. This corresponds to a layout of delocalized antennas. The reception sensors $3_M$ are sufficiently separated to ensure a decorrelation between the different propagation channels.

The idea of the invention is based especially on the joint processing of all the signals sent, in considering these signals to be useful signals, rather than in seeking to estimate one of them while considering the other signals to be noise.

The processor 5 linked with the reception antennas $3_M$ is provided for example with an algorithm enabling an antenna of co-localized sensors to receive several messages coming from delocalized or co-localized transmission antennas, through an urban, mountainous or tunnel type propagation channel for example.

Various exemplary receivers are given here below in the description.

In short, the method according to the invention comprises especially the following steps:
a) Simultaneously transmitting different messages on the N transmission antennas $2_N$,
b) Simultaneously receiving the different superimposed messages on M reception antennas $3_M$,
c) Estimating the characteristics of the transmission channel with respect to each reception antenna,
d) jointly estimating all the messages received in taking account of the information from the sensors (signals received on the sensors) as well as the characteristics of the above-mentioned channel.

In normal operating conditions, the method does not use any intrinsic system to differentiate between users, as is done for example with the codes used at the CDMA level.

In normal operating conditions, the method does not require any space-time encoding at transmission.

The characteristics of the channel may be estimated according to a method known to those skilled in the art. For example, the estimation is carried out by using reference sequences included in the signals, such as the GSM "training sequence".

The transmissions may be unicast or multicast (point-to-multipoint as well as multipoint-to-multipoint) communications.

Before providing a detailed description of the various possibilities of processing at reception, corresponding to the step d) of the method, a few points about the signals are recalled.

Model of the Signal

The signal received by the network of sensors is expressed in the case of a single transmission by the relationship (1)

$$x(t)=h(t,\tau)*s(t)+n(t) \qquad (1)$$

where
  x(t) is the received signal,
  h(t,τ) is the vector of the transmission channel having a dimension M, t being the time and τ the temporal spread,
  s(t) is the transmitted GMSK (Gaussian Minimum Shift Keying) signal that does not comprise any identifier proper to a user,
  n(t) is the noise vector, with a dimension N, assumed to be spatially and temporally Gaussian white noise having a covariance $\sigma^2 I$.

In the case of a multiple-transmission context for which the types of propagation give rise to a diversity of transmission and, therefore generate decorrelated propagation channels on an antenna with several sensors that are spatially distant from each other, the received signal is modeled by the following expression:

$$x(t) = \sum_{u=1}^{U}\sum_{p=1}^{P} \alpha_p^u(t) s^u(t-\tau_p^u(t)) + n(t)$$

with
  $s^u(t)$ the signal transmitted by the user,
  $\alpha_p^u(t)$ the vector with a dimension N grouping the complex amplitudes of the path P for the signal u transmitted,
  $\tau_p^u$ the propagation delay of the path P for the transmitted signal U, P is the number of propagation paths, assumed to be equal for each transmitter, U is the number of simultaneous transmissions.

Hereinafter in the description of a GSM context that does not restrict the scope of the invention, the complex amplitudes and the propagation delays shall be considered to be invariant over a period of time equivalent to one GSM burst, namely 0.5 ms. This is an example given in order to simply the notations, by way of an illustration that no way restricts the scope of the invention.

Linearization of the Modulation in the Example Given for the GSM

In the case of the non-restrictive application to the GSM system, the modulation used in transmission is of the GMSK (Gaussian Minimum Shift Keying) type. This modulation is a modulation using memorized symbols. The modulation is dependent on three symbols at each instant t. The optimum demodulator in SGWN (standard Gaussian white noise) is implemented for example by a Viterbi decoder known to those skilled in the art. Owing to the number of possible phase states ($0, \pi/2, \pi, 3\pi/2$) and the number of memory symbols (c), the decoder comprises 16 states $(3-1)^4$ to be examined for each bit received.

In order to simplify the problem induced by the memory symbol and related to the GMSK modulation, a simplification is obtained by means of an equivalent representation using a combination of linear modulations, described for example in the article by P.A. Laurent, "Exact and Approximate Construction of Digital Phase Modulations by Superposition of Amplitude Modulated Pulses (AMP)" in IEEE Trans. Communications, Vol. 34, pp. 150-60, 1986.

This linear combination can be expressed in the following form (3):

$$s(t) = \sum_{n=-\infty}^{\infty} j^{A_{0,n}} [C_0(t - nT_s) +$$

$$j^{-a_{n-1}} C_1(t - nT_s) + j^{a_{n-2}} C_2(t - nT_s) + j^{a_{n-1} - a_{n-2}} C_3(t-1)$$

with $$A_{0,n} = \sum_{i=-\infty}^{n} a_i$$

The functions $C_0(t), \ldots, C_3(t)$ shown in FIG. 3 are obtained from the above-mentioned breakdown.

Given the small contribution of the coefficients $C_0(t), \ldots, C_3(t)$, the GMSK modulation is expressed according to the relationship (4):

$$s(t) = \sum_{n=0}^{\infty} j^{A_{0,n}} C_0(t - nT_s)$$

the function $C_0(t)$ being defined on 4 symbols.

In this case, the standard Gaussian white noise (SGWN) demodulation that meets the Nyquist criterion is obtained, for example, through a simple matched filter (MF), followed by a sampler working at the symbol rhythm and a decision-making operation.

FIG. 4 illustrates the low distortion introduced by the linear approximation method as compared with a classic GMSK demodulation using the Viterbi decoder. The curves (I), (II), (III) respectively correspond to the linear approximation method, the theoretical curves and an optimum Viterbi type demodulation. The x-axis corresponds to the ratio $E_b/N_0$ with $E_b$ being the binary energy and $N_0$ being the spectral power density of the noise.

Model of the Signal in Multiple-User Transmission Mode

In the multiple-user context, the propagation or transmission channel is modeled as being specular. This representation is given by way of an illustration; it is in no way restrictive, and any other type of adaptive modeling may be used.

The model of the signal in this example is modified in order to take account of these new assumptions according to the following relationship (5):

$$x(t) = \sum_{u=1}^{U} \sum_{p=1}^{P} \alpha_p^u s^u(t - \tau_p^u) + n(t)$$

After linear approximation, the signal received by the sensors is written as follows (6):

$$x(t) = \sum_{u=1}^{U} \sum_{p=1}^{P} \sum_{n=1}^{N_a} \alpha_p^u \cdot j^n \cdot b_n^u \cdot C_0(t - nT_s - \tau_p^u) + n(t)$$

where $N_a$ is the number of symbols sent.

After oversampling at the frequency $F_e = 1/T_e$ with $T_e = T_{symbol}/K$ (K being the oversampling factor) the received signal becomes (7):

$$x(nT_e) = \sum_{u=1}^{U} \sum_{p=1}^{P} \sum_{n=1}^{N_a} \alpha_p^u j^n \cdot b_n^u \cdot C_0(nT_e - nT_s - \tau_p^u) + n(nT_e)$$

with $x(nT_e)$ having dimensions $N*N_e$,

N is the number of sensors and $N_e$ is the number of samples on the temporal section $nT_e$ such that (8):

$$x = [x^T(0), \ldots x^T((N_e-1)T_e)]^T$$

where $N_e$ is chosen to be equal to:

$$N_a(4 \cdot k + L - 1)$$

with L as the length of the channel verifying (9)

$$0 \leq \tau_p^u \leq (L-1)T_e, \forall u, p$$

The number 4 is related to the temporal duration expressed in symbols of the function $C_0(t)$.

The matrix formulation of the signal x leads to (10):

$$x = Ha + n$$

where the vector a with a dimension $N_a*U$ is written as follows:

$$a = [a_1^T, \ldots, a_{N_a}^T]^T$$

with:

$$a_n = j^n \cdot [b_n^1, \ldots, b_n^U]^T$$

The matrix H ($N \cdot N_e * N_a$) represents the convolution of the impulse response of the channel that is oversampled by the function $C_0(t)$ $$\tilde{H} = [C^1 \cdots C^U]$$ (11)

or:

$$C^u = \sum_{p=1}^{P} \begin{bmatrix} 0_{\tau_p^u} \\ c_{\tau_p^u} \\ \overline{0}_{\tau_p^u} \end{bmatrix}$$

with:

$$c_{\tau_p^u} = [C_0(lT_e - \tau_p^u), \cdots, C_0((l+4\cdot k)T_e - \tau_p^u)]^T \otimes \alpha_p^u$$

$$l = \underset{l}{\operatorname{argmin}}\left[\frac{\tau_p^u}{lT_e}\right]$$

⊗ is the Kronecker product.

This model is used in remaining part of the method according to the invention.

Detailed Explanation of the Processing Step d) at Reception

The method and the system according to the invention use an algorithm for the reception of several signals on an antenna of co-localized sensors of several messages coming from delocalized or co-localized transmission antennas and through an urban, mountainous or tunnel type of propagation channel for example.

The following description gives three exemplary receivers used to execute especially the step d).

Optimal Receivers

An optimal receiver jointly estimates the transmitted sequences and the propagation channels. These receivers nevertheless have the drawback of becoming rapidly complex.

Various types of equalizers may be chosen such as the MF (Matched Filter), DFE ZF (Decision Feedback Equalizer—Zero Forcing filter) and the DFE MMSE (Decision Feedback—Minimum Mean Squared Error filter).

The results obtained in simulations have shown that only the linear MMSE sub-optimal receivers as well as the non-linear DFE-MMSE type equalizers perform best in terms of residual bit error rate (BER).

Linear Sub-Optimal MMSE Receivers

After the matched filter H, which may or may not be a whitening filter, is applied to the received signals x, we obtain $$y = H^H x$$ (12)

In the application to the GSM context, the MMSE detector is a filter applied to the output of the MF minimizing the mean squared error between the output of the receiver and the real symbols such that (13):

$$E\left[\left\|M_{MMSE} \cdot \begin{bmatrix} y \\ y^* \end{bmatrix} - a\right\|^2\right]$$

a is defined by $e_i = [0,0,\ldots 0,1,0,\ldots,0]$ with the 1 in position i the minimization step leads to the expression (14):

$$E\left[e_j^T \cdot \begin{bmatrix} y \\ y^* \end{bmatrix} \cdot [y^\dagger \quad y^T] \cdot M_{MMSE}^\dagger e_i\right] = E\left[e_j^T \cdot \begin{bmatrix} y \\ y^* \end{bmatrix} \cdot a^\dagger \cdot e_i\right]$$

with:

$$E[yy^\dagger] = \overline{H}\overline{H}^\dagger + \sigma^2 \overline{H}$$

$$E[yy^T] = \overline{H}\tilde{I}\overline{H}^T$$

the criterion becomes:

$$\left[\begin{bmatrix} \overline{H}\overline{H}^\dagger & \overline{H}\tilde{I}\overline{H}^T \\ \overline{H}^*\tilde{I}\overline{H}^\dagger & \overline{H}^*\overline{H}^T \end{bmatrix} + \sigma^2 \begin{bmatrix} \overline{H} & 0 \\ 0 & \overline{H}^* \end{bmatrix}\right] \cdot M_{MMSE}^\dagger = \begin{bmatrix} \overline{H}I \\ \overline{H}^*\tilde{I} \end{bmatrix}$$ (15)

Giving the relationship (16):

$$M_{MMSE}^\dagger = \begin{bmatrix} H_n H_n^\dagger + \sigma^2 H_n & H_n \tilde{I}_n H_n^T \\ H_n^* \tilde{I}_n H_n^\dagger & H_n^* H_n^T + \sigma^2 H_n \end{bmatrix}^{\#} \cdot \begin{bmatrix} H_n I_7 \\ H_n I_8 \end{bmatrix}$$

where # corresponds to the pseudo-inverse value.

This linear receiver is optimal, with respect to its criterion, on the blocks (or slots) of the GSM transmission and takes account of the fine structure of the FDD/TDMA (Frequency Division Duplex/Time Division Multiple Access) frames.

Non-Linear Sub-Optimal Mmse Receiver

They have the advantage of minimizing the size of the matrix inversions.

Figure 5:
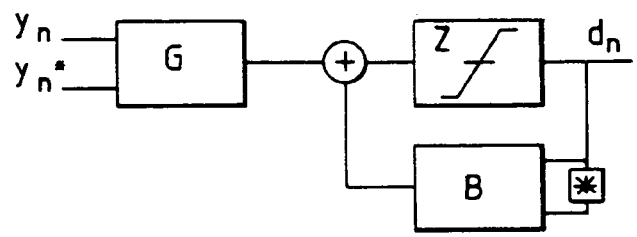
FIG. 5 shows the structure of the standard DFE or decision feedback equalizer.

The structure of a standard DFE equalizer is defined in FIG. 5

The filtering function G is commonly called a "Feed Forward" function and the function B is called a "Feedback" function.

Two types of DFE equalizers may be considered: the ZF (Zero Forcing) equalizer and the MMSE (Minimum Mean Square Error) equalizer.

It is recalled that the ZF type equalizers do not take the presence of noise into account. This limits the performance obtained for them for low signal-to-noise ratios.

Consequently, only the MMSE Equalizer is described in the following method.

The optimization criterion minimizing the mean squared error at output of the equalizer is written as follows (17):

$$E\left[\left\|[G-B]\begin{bmatrix} y_n \\ y_n^* \\ d_n \\ d_n^* \end{bmatrix} - b_n\right\|^2\right]$$

where:

$$y_n = [\overline{y}_{n-L_G}^T \ldots \overline{y}_n^T \ldots \overline{y}_{n+L_G}^T]^T$$

with:

$$y = [\overline{y}_1^T \ldots \overline{y}_{N_a}^T]^T$$

and:

$$b_n = [a_{n-L_G}{}^T \ldots a_n{}^T \ldots a_{n+L_G}{}^T]^T \text{ represents a vector of symbols}$$

and:

$$d_n = [a_{n-L_a}{}^T \ldots a_{a-1}{}^T]^T$$

The matrix $H_n$ contains the impulse response corresponding to the observation $y_n$:

$$y_n = H_n b_n + n_n$$

with $n_n$ being the correlated noise vector corresponding to the observation $y_n$.

The filters G and B are obtained according to the following relationships (18):

$$\begin{bmatrix} G^\dagger_{DFE-MMSE} \\ B^\dagger_{DFE-MMSE} \end{bmatrix} = \begin{bmatrix} H_n H_n^\dagger + \sigma^2 H_n & H_n \tilde{I}_n H_n^T & H_n I_3 & H_n I_4 \\ H_n^* \tilde{I}_n H_n^\dagger & H_n^* H_n^T + \sigma^2 H_n & H_n^* I_4 & H_n^* I_3 \\ I_3^T H_n^\dagger & I_4^T H_n^T & I_5 & I_6 \\ I_4^T H_n^\dagger & I_3^T H_n^T & I_6 & I_5 \end{bmatrix}^{\#} \cdot \begin{bmatrix} H_n \\ H_n \\ 0 \\ 0 \end{bmatrix}$$

The length of the filter B is equal to LB and that of the filter G is equal to 2 (2LG+1)

With:

$$\tilde{I}_n = E[b_n * b_n^\dagger]$$

$$I_3 = E[b_n d_n^\dagger]$$

$$I_4 = E[b_n d_n^T]$$

$$I_5 = E[d_n d_n^\dagger]$$

$$I_6 = E[d_n * d_n^\dagger]$$

$$I_7 = E[b_n a_n^\dagger]$$

$$I_8 = E[b_n * a_n^\dagger]$$

Figure 6:
FIG. 6 shows two contexts of application of the method according to the invention.

The method described here above can be applied especially well in the context of urban or mountainous environments, or again for metropolitan underground rail transit or railway tunnels as shown diagrammatically in FIG. 6.

The former case gives rise to a multiple-path context that generates a sum of several correlated and delayed signals. The latter case is categorized chiefly by a major attenuation in the first decameters traveled and a sum of different parts giving rise, at the reception sensors, to a major space-time correlation. The two types of propagation generate a diversity of transmission. They therefore generate decorrelated propagation channels on an antenna with several sensors spatially distant from each other.

Urban, mountainous or tunnel type propagation induces multiple paths converging toward the concerned receiver. Consequently, a Doppler spread is generated by randomly modifying the complex characteristics of the signal received by each of the sensors and thus creating propagation diversity.

FIGS. 7 to 11 represent results obtained by implementing the method according to the invention.

The performance characteristics of the block equalizers and non-block equalizers are presented and compared. The values of the filters computed depend on the chosen length of the transverse filter.

Model of the Transmission Channel

Figure 7:
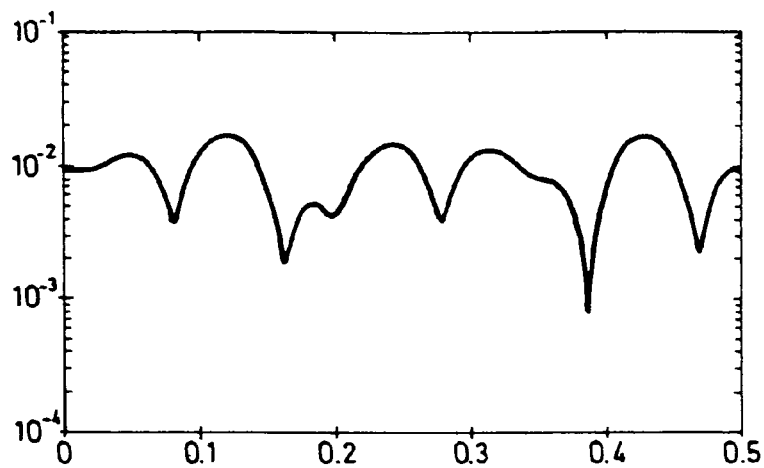
FIGS. 7 to 10 show results obtained by implementing the method according to the invention.
Figure 8:
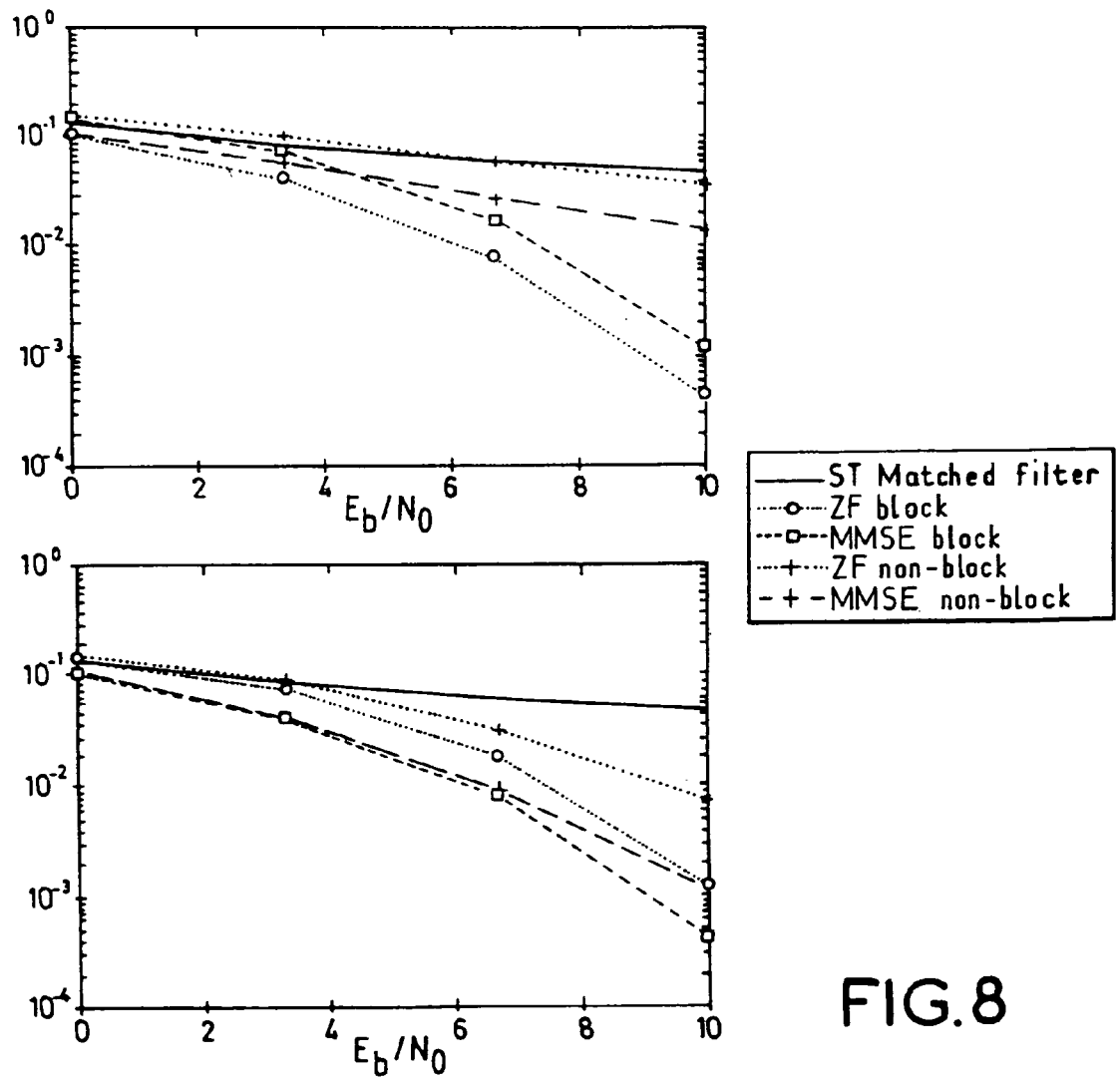

FIG. 7 represents the frequency response of the transmission channel.

The results have been obtained for a channel with the following characteristics:

4 paths in a channel $$\tau = [1, 14, 17, 11]$$

complex amplitudes of the paths:

$$\alpha = [-0.6632 + 0.0188i, 0.0622 - 0.054i, -0.343 + 0.2573, i0.1366 - 0.655]$$

symbol oversampling factor: 4

Results Obtained in the Case of Multiple Sending, Multiple Reception and Multiple Paths Two transmission scenarios are considered here:
1. MIMO unicast transmission
2. MIMO multicast transmission In the first case, the transmitters are separated by a distance greater than the correlation distance of the channel considered. In this case, the profile of the channel is the same for all the paths (DOA and induced delays). This is a classic case in tunnel type propagation.

Figure 9:
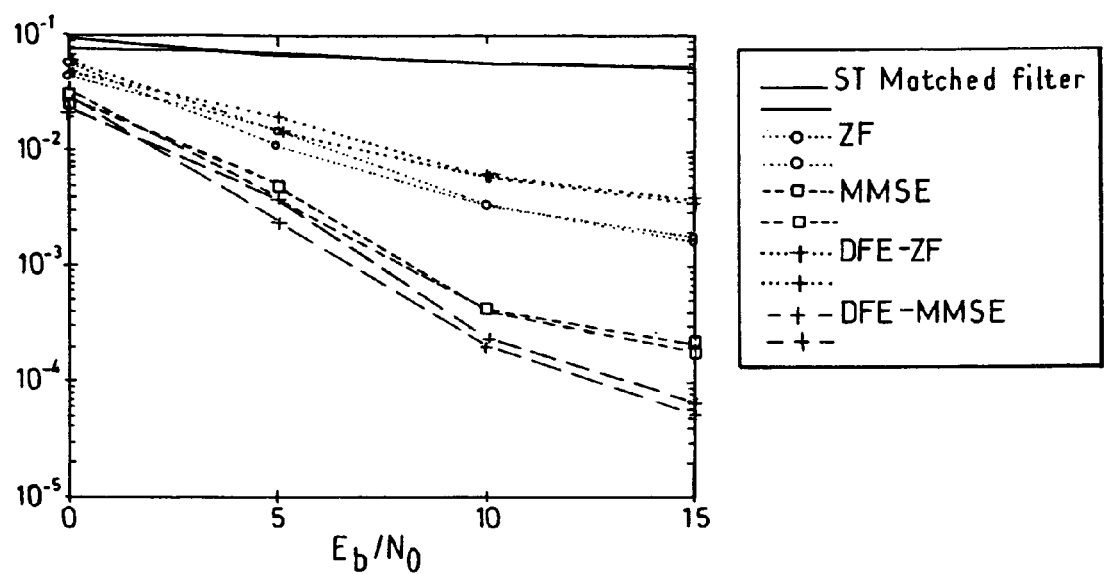

FIG. 9 shows the performance obtained in the case of two delocalized transmission operations, three reception sensors, two paths per channel and non-block receivers.

The DFE-MMSE (Decision Feedback Equalizer-Zero Forcing) system offers the best performance and is not excessively sensitive to inter-symbol interference (ISI) introduced by the second path.

Figure 10:
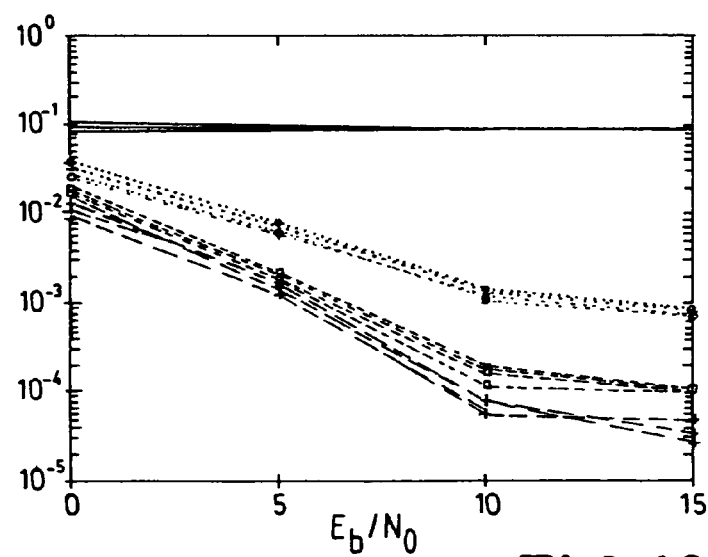

In the second case, the propagation channels are totally decorrelated (outdoor transmission). This makes it possible especially to validate the feasibility of transmission in the context of a metropolitan underground rail transit tunnel in a ratio of 4 with respect to standard GSM transmission. The performance obtained in this type of scenario is shown in FIG. 10 whose notations are identical to those of FIG. 9, taken by way of an example.

The conditions are the following: 4 transmission operations, 5 reception sensors, one path per channel with the same delay and one non-block receiver.

The figure shows that the performance is better than in the case of FIG. 9. This is related to the fact that the capacity of the transmission channel increases when the number of transmission and reception antennas increases.

The above results are obtained without any error correction system and give error rates of to $10^{-3}$ to $10^{-4}$ for signal-to-noise (S/N) ratios of over 5 dB.

What is claimed is:

1. A receiver apparatus in a communication system including N transmitters and M receivers, with M greater than or equal to N, said receiver being one of said M receivers, said receiver comprising:

a reception agent configured to simultaneously receive a superimposition of different messages sent by the N transmitters, which are spatially delocalized;

a demodulating agent configured to decode a signal representing said superimposition of the different messages sent by the N transmitters received by the reception agent;

a channel estimating agent configured to estimate a characteristic of a transmission channel between one of said N transmitters and said receiver by combining information of all of the different messages, the information of all the different messages based on said decoded signal representing said superimposition of the different messages sent by the N transmitters; and an equalizer filter, coupled to said reception agent, configured to minimize a mean squared error between an output of said equalizer filter and a corresponding real symbol, said equalizer filter having a feed forward filtering function and a feed back filtering function, wherein said equalizer filter is configured to minimize mean squared error according to:

$$E\left[\left\|[G-B]\begin{bmatrix}y_n\\y_n^*\\d_n\\d_n^*\end{bmatrix}-b_n\right\|^2\right]$$

where,
G is the feed forward function,
B is the feed back function,
$y_n$ is a symbol at input of G,
$d_n$ is a symbol at input of B,
$b_n$ is a real symbol.

2. The receiver apparatus according to claim 1, wherein the demodulating agent comprises a SGWN (Standard Gaussian White Noise) demodulator.

3. The receiver apparatus according to claim 2, wherein the SGWN demodulator is implemented by a Viterbi decoder.

4. The receiver apparatus according to claim 1, wherein the equalizer filter further comprises a MF (Matched Filter).

5. The receiver apparatus according to claim 1, wherein the equalizer filter further comprises a DFE ZF (Decision Feedback Equalizer-Zero Forcing Filter).

6. The receiver apparatus according to claim 1, wherein the equalizer filter further comprises a DFE MMSE (Decision Feedback Equalizer-Minimum Mean Squared Error Filter).

7. The receiver apparatus according to claim 1, wherein the N transmitters which are spatially delocalized are spaced at a sufficient distance from the M receivers as compared to a spatial decorrelation distance.

8. The receiver apparatus of claim 1, wherein the equalizer filter is configured to minimize the mean squared error between the output of the equalizer filter and the corresponding real symbol to produce a bit-error-rate of less than $10^{-3}$, when the signal-to-noise ratio of the signal is greater than 5 dB.

9. A receiver apparatus in a communication system including N transmitters and M receivers, with M greater than or equal to N, said receiver being one of said M receivers, said receiver comprising:

means for receiving simultaneously a superimposition of different messages sent by the N transmitters, which are spatially delocalized;

means for demodulating to decode a received signal representing said superimposition of the different messages sent by the N transmitters;

means for estimating a characteristic of a transmission channel between one of said N transmitters and said receiver by combining information of all of the different messages, the information of all the different messages based on said decoded signal representing said superimposition of the different messages sent by the N transmitters; and means for equalizing, coupled to means for receiving, to minimize a mean squared error between an output of said means for equalizing and a corresponding real symbol, said means for equalizing having a feed forward filtering function and a feed back filtering function, wherein said means for equalizing includes means for minimizing said mean squared error according to:

$$E\left[\left\|[G-B]\begin{bmatrix}y_n\\y_n^*\\d_n\\d_n^*\end{bmatrix}-b_n\right\|^2\right]$$

where
G is the feed forward function,
B is the feed back function,
$y_n$ is a symbol at input of G,
$d_n$ is a symbol at input of B,
$b_n$ is a real symbol.

10. The receiver apparatus according to claim 9, wherein the N transmitters which are spatially delocalized are spaced at a sufficient distance from the M receivers as compared to a spatial decorrelation distance.

11. The receiver apparatus of claim 9, wherein the means for minimizing minimizes the mean squared error between the output of the means for equalizing and the corresponding real symbol to produce a bit-error-rate of less than $10^{-3}$, when the signal-to-noise ratio of the signal is greater than 5 dB.

12. A receiving method configured to operate in a communication system including N transmitters and M receivers, with M greater than or equal to N, said receiver being one of said M receivers, said receiving method comprising:

receiving, at said receiver, simultaneously a superimposition of different messages sent by the N transmitters, which are spatially delocalized;

demodulating, at a demodulator of said receiver, to decode a received signal representing said superimposition of the different messages sent by the N transmitters;

estimating a characteristic of a transmission channel between one of said N transmitters and said receiver by combining information of all of the different messages, the information of all the different messages based on said decoded signal representing said superimposition of the different messages sent by the N transmitters; and minimizing at an equalizer filter coupled to the receiver a mean squared error between an output of an equalizing filter and a corresponding real symbol, said minimizing including filtering with a feed forward filtering function and a feed back filtering function, wherein said minimizing said mean squared error is performed according to:

$$E\left[\left\|[G-B]\begin{bmatrix}y_n\\y_n^*\\d_n\\d_n^*\end{bmatrix}-b_n\right\|^2\right]$$

where
G is the feed forward function,
B is the feed back function,
$y_n$ is a symbol at input of G,
$d_n$ is a symbol at input of B,
$b_n$ is a real symbol.

13. The method of claim 12, further comprising:
estimating the characteristics of the transmission channel using a training sequence included in a message.

14. The method of claim 12, further comprising:
demodulating the received signal with a SGWN (Standard Gaussian Wide Noise) demodulator.

15. The method of claim 12, wherein the SGWN demodulator is a Viterbi decoder.

16. The method of claim 12, further comprising:
equalizing at equalizer filter using a MF (Matched Filter).

17. The method of claim 12, further comprising:
equalizing at equalizer filter using a DFE ZFF (Decision Feedback Equalizer-Zero Forcing Filter).

18. The method of claim 12, further comprising:
equalizing at equalizer filter using a DFE MMSE (Decision Feedback Equalizer-Minimum Mean Squared Error Filter).

19. The method of claim 12, wherein
the N transmitters which are spatially delocalized are spaced at a sufficient distance from the M receivers as compared to a spatial decorrelation distance.

20. The receiver method of claim 12, further comprising:
minimizing the mean squared error between the output of the equalizing filter and the corresponding real symbol to produce a bit-error-rate of less than $10^{-3}$, when the signal-to-noise ratio of the signal is greater than 5 dB.

* * * * *